United States Patent
Matsumoto et al.

(10) Patent No.: US 11,603,057 B2
(45) Date of Patent: Mar. 14, 2023

(54) VEHICLE BODY

(71) Applicants: Toyota Jidosha Kabushiki Kaisha, Toyota (JP); Subaru Corporation, Tokyo (JP)

(72) Inventors: Tomohiro Matsumoto, Tokyo (JP); Iwao Furukawa, Tokyo (JP); Akinari Hattori, Toyota (JP)

(73) Assignees: TOYOTA JIDOSHA KABUSHIKI KAISHA, Toyota Aichi-ken (JP); SUBARU CORPORATION, Shibuya-ku Tokyo (JP)

( * ) Notice: Subject to any disclaimer, the term of this patent is extended or adjusted under 35 U.S.C. 154(b) by 75 days.

(21) Appl. No.: 17/389,981

(22) Filed: Jul. 30, 2021

(65) Prior Publication Data
US 2022/0089113 A1  Mar. 24, 2022

(30) Foreign Application Priority Data
Sep. 23, 2020 (JP) .............................. JP2020-158817

(51) Int. Cl.
*B60J 7/00* (2006.01)
*B60R 19/34* (2006.01)
*B62D 25/08* (2006.01)

(52) U.S. Cl.
CPC .............. *B60R 19/34* (2013.01); *B62D 25/08* (2013.01)

(58) Field of Classification Search
CPC ...... Y10T 29/49826; A47C 4/02; A61P 43/00; A61P 35/00; B29C 48/10; B29C 48/913; H01H 9/042; H01R 13/527; H01R 9/2625
See application file for complete search history.

(56) References Cited

U.S. PATENT DOCUMENTS

| | | | |
|---|---|---|---|
| 2005/0206177 A1* | 9/2005 | Arns .................. | B60R 19/34 293/155 |
| 2015/0028606 A1* | 1/2015 | Eckert ................ | B62D 21/152 293/133 |
| 2016/0185391 A1* | 6/2016 | Suzuki ................ | B62D 25/087 296/187.11 |
| 2019/0276080 A1* | 9/2019 | Otoguro ............. | B60K 1/04 |
| 2020/0102014 A1* | 4/2020 | Sakai .................. | B62D 21/07 |
| 2020/0231216 A1* | 7/2020 | Choi ................... | B62D 21/155 |

FOREIGN PATENT DOCUMENTS

JP          2007-131040 A          5/2007

* cited by examiner

*Primary Examiner* — Kiran B Patel

(74) *Attorney, Agent, or Firm* — Dinsmore & Shohl LLP

(57) ABSTRACT

A vehicle body includes: a rear side member that is extended in the front-rear direction at the rear portion of the vehicle body; a back panel that is in contact with a rear end of the rear side member; and a crash box that is disposed between the back panel and a rear bumper and is positioned behind the rear side member. The crash box is fixed to the back panel with a bolt passed through a bolt hole that is extended through the back panel and that is positioned above the rear end of the rear side member. The rear side member is a hollow beam having a pair of side plates, an upper plate, and a lower plate, and a rear portion of the upper plate configures a flange that is bent upward along a lower back panel. The flange covers the bolt and the bolt hole.

4 Claims, 4 Drawing Sheets

VEHICLE BODY

CROSS-REFERENCE TO RELATED APPLICATION

This application claims priority to Japanese Patent Application No. 2020-158817 filed on Sep. 23, 2020, incorporated herein by reference in its entirety.

BACKGROUND

1. Technical Field

The technology disclosed in the present specification relates to a vehicle body. In particular, the technology relates to a vehicle body in which an assembly cost of a rear portion of the vehicle body can be suppressed.

2. Description of Related Art

A vehicle body has a rear side member, a rear bumper, and a crash box. The rear side member corresponds to a frame for ensuring the strength of the rear portion of the vehicle body. The crash box is disposed between a rear end of the rear side member and the rear bumper. The crash box mitigates the impact of a collision by being collapsed when an obstacle hits the rear bumper. Japanese Unexamined Patent Application Publication No. 2007-131040 (JP 2007-131040 A) shows an example of a vehicle body including a rear side member, a rear bumper, and a crash box.

SUMMARY

A back panel is sandwiched between the rear side member and the crash box. The crash box is disposed behind the rear side member and is fixed to the back panel by a bolt. The back panel is a part of the vehicle body and is a metal plate corresponding to a rear surface of the vehicle body. A through-hole (bolt hole) is provided in the back panel, and a bolt for fixing the crash box is passed through the bolt hole. A cover that covers the bolt hole and the bolt from the inside of the vehicle is attached to the back panel to prevent water from entering the vehicle body through the bolt hole. The bolt for fixing the crash box is disposed above the rear side member. The cover is disposed above the rear side member. The present specification provides a technique for suppressing the assembly cost of the rear portion of the vehicle body including the cover that covers the through-hole of the back panel.

A vehicle body according to one aspect of the present disclosure includes: a rear side member that is extended in the front-rear direction at the rear portion of the vehicle body; a back panel that is in contact with a rear end of the rear side member; and a crash box. The crash box is disposed between the back panel and a rear bumper and is positioned behind the rear side member. The crash box is fixed to the back panel with a bolt passed through a bolt hole that is extended through the back panel and that is positioned above the rear end of the rear side member. The rear side member is a hollow beam having a pair of side plates, an upper plate, and a lower plate, and a rear portion of the upper plate configures a flange that is bent upward along a lower back panel. The flange covers the bolt that fixes the crash box to the back panel and the bolt hole.

In the vehicle body disclosed herein, the rear portion of the upper plate of the rear side member forms a flange, and the flange covers the bolt that fixes the crash box and covers the bolt hole through which the bolt is passed. The flange prevents water from entering the vehicle through the bolt hole on the back panel. That is, the flange acts as a cover that covers the bolt hole. Since the cover that covers the bolt hole is included in the structure of the rear side member, the assembly cost of the rear portion of the vehicle body can be suppressed.

In the above aspect, the edge of the flange may be joined to the back panel. Further, in the above aspect, a recess may be provided on the surface of the flange on the vehicle body rear side, and the tip or the head of the bolt may be disposed in the recess. It is possible to effectively suppress the water from entering the vehicle cabin through the bolt hole.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
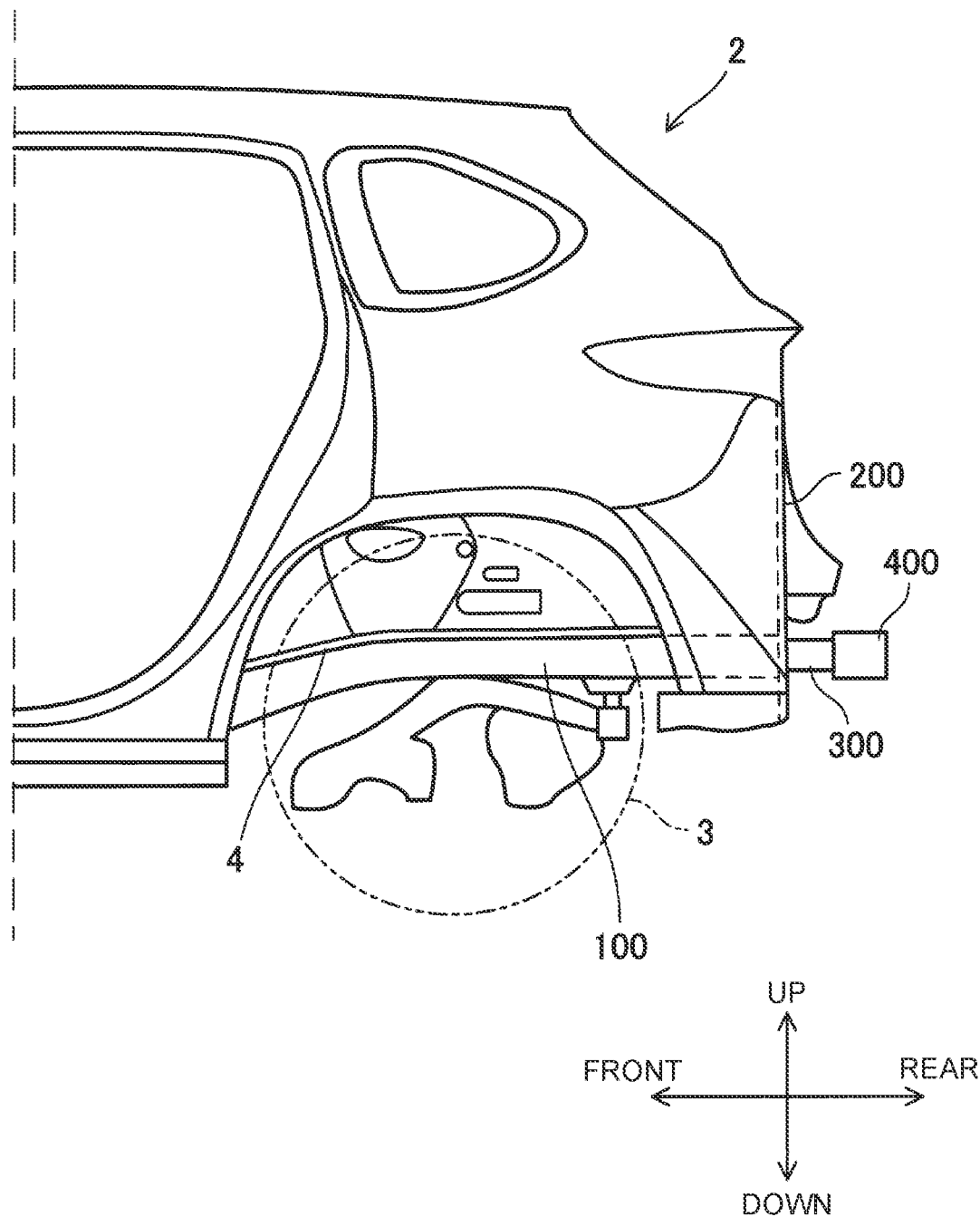
FIG. 1 is a side view of a vehicle body.
Figure 2:
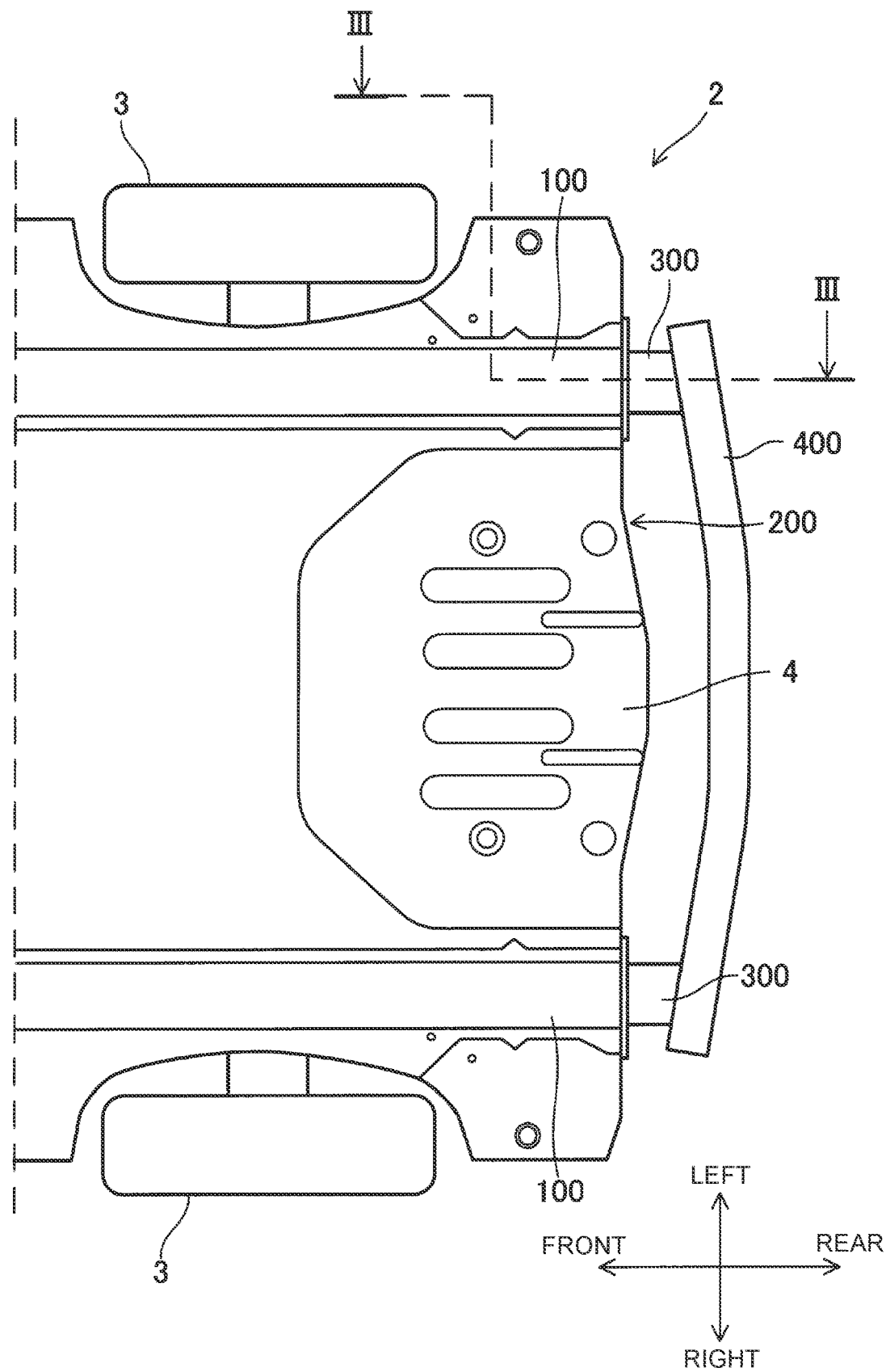
FIG. 2 is a bottom view of the vehicle body.
Figure 3:
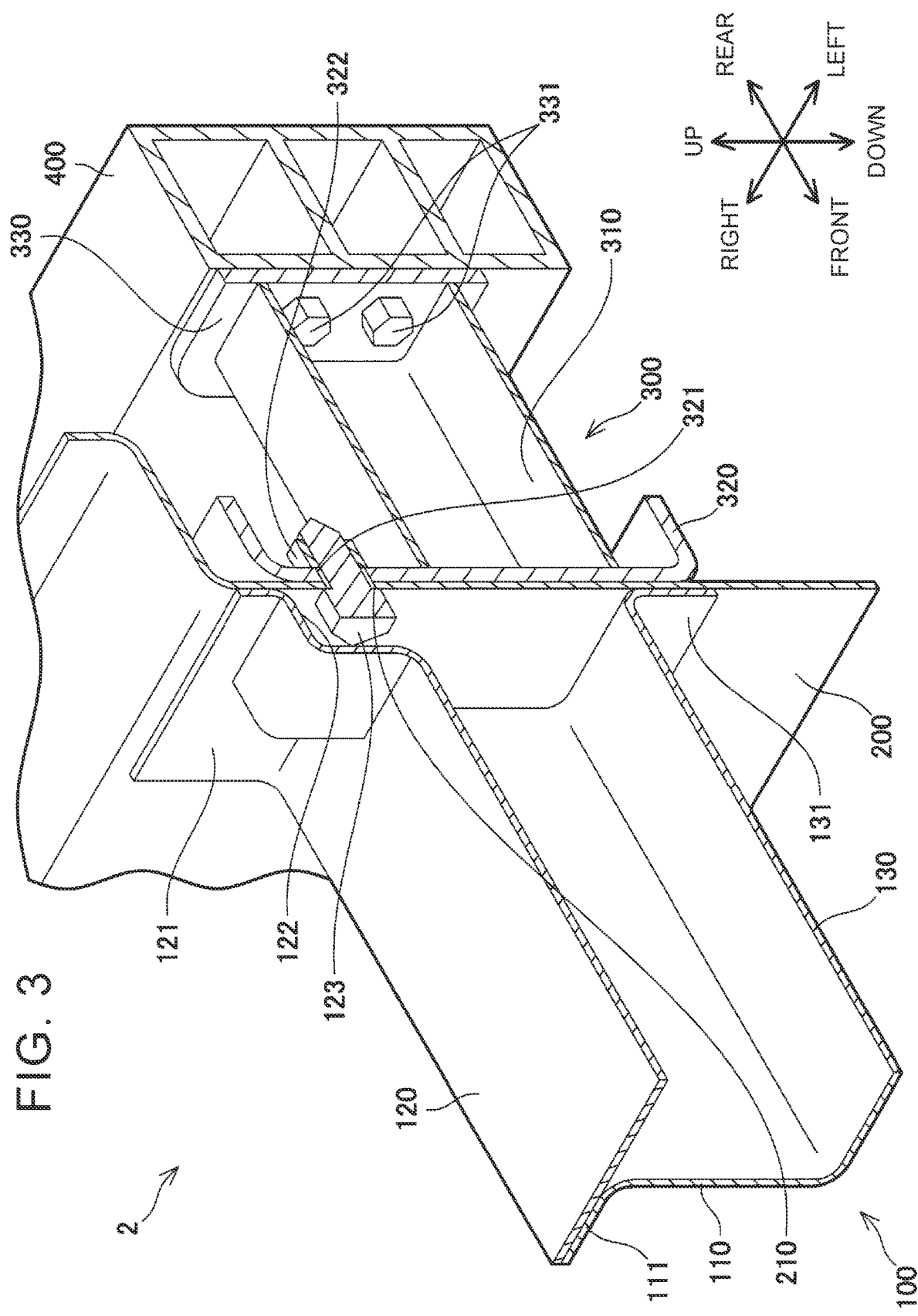
FIG. 3 is a perspective view of the vehicle body cut along line III-III in FIG. 2.
Figure 4:
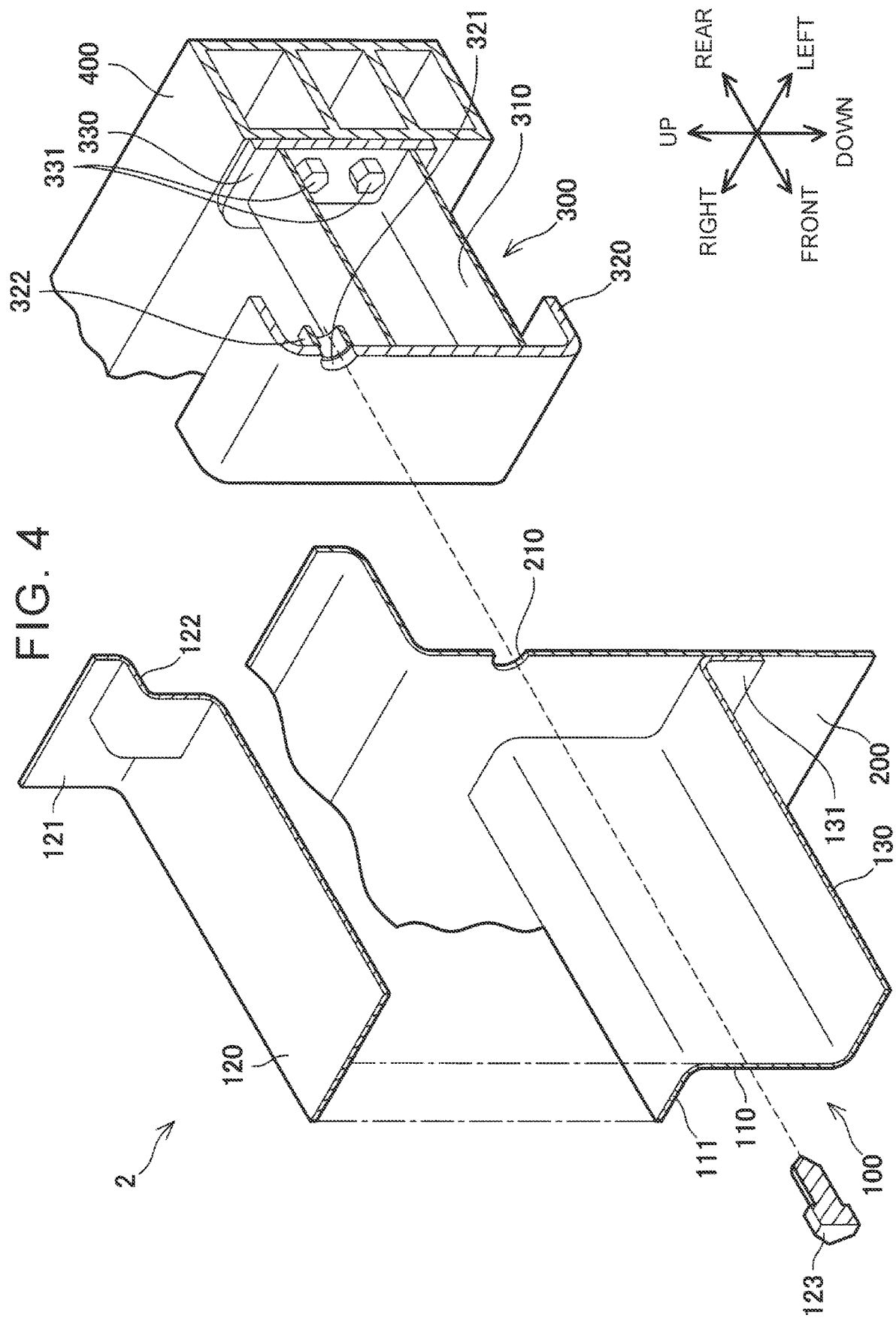
FIG. 4 is an exploded perspective view corresponding to FIG. 3.

A vehicle body 2 of an embodiment will be described with reference to the drawings. FIG. 1 shows a side view of the vehicle body 2, and FIG. 2 shows a bottom view of the vehicle body 2. In FIGS. 1 and 2, a front half of the vehicle body 2 is not shown. Further, in FIG. 1, a rear wheel 3 is drawn by a virtual line. The terms "FRONT" and "REAR" in a coordinate system in FIG. 1 indicate a direction with respect to the vehicle body 2. Further, the terms "LEFT" and "RIGHT" indicate the "left" and the "right" when the front of the vehicle body 2 is viewed from behind the vehicle body 2. In FIGS. 2, 3 and 4, the meaning of each axis of the coordinate system is also the same.

The vehicle body 2 includes two rear side members 100, a back panel 200, two crash boxes 300, and a rear bumper 400. The two rear side members 100 and the two crash boxes 300 are disposed symmetrically with respect to a center line of the vehicle body 2. Since the vehicle body 2 is symmetrical, the rear side member 100 and the crash box 300 on the left side of the vehicle body 2 will be described below.

The rear side member 100 is extended at a rear portion of the vehicle body 2 along the front-rear direction of the vehicle body 2. The rear side member 100 is a part of a frame for ensuring the strength of the rear portion of the vehicle body 2. The rear floor panel 4 is in contact with the rear side member 100.

A rear end of the rear side member 100 is in contact with the back panel 200. The rear side member 100 is fixed to the back panel 200 by welding or bolts. The back panel 200 corresponds to an outer plate on a rear surface of the vehicle body 2. Since the back panel 200 in the present specification corresponds to an outer plate of a rear lower portion of the vehicle body 2, the back panel 200 is sometimes called a lower back panel.

The rear bumper 400 is disposed at a rearmost portion of the vehicle body 2. As it is well known, the rear bumper 400 protects the vehicle body 2 (particularly a vehicle cabin) from a collision of obstacles from behind. The rear bumper 400 in the figure is a main component that protects the vehicle body 2, and is sometimes called a rear bumper reinforcement. The rear bumper 400 is made of a thick metal plate and retains a high strength.

Although the rear bumper 400 (rear bumper reinforcement) is covered with a rear bumper cover made of resin (or a thin metal plate), the rear bumper cover is not shown in FIGS. 1 and 2. The rear bumper cover is not shown in FIGS. 3 and 4 described later.

The rear bumper 400 is fixed to the back panel 200 via the crash box 300. The crash box 300 is disposed behind the rear side member 100. More precisely, the crash box 300 faces the rear end of the rear side member 100 with the back panel 200 disposed therebetween. When an obstacle approaching the vehicle from behind collides with the rear bumper 400, the impact of the collision is transmitted to the rear side member 100 via the crash box 300. A longitudinal direction of the rear side member 100 is along the front-rear direction of the vehicle body 2, and the rear side member 100 is tough against an impact from directly behind. The crash box 300 positioned between the tough rear side member 100 and the rear bumper 400 is collapsed in the front-rear direction when it receives an impact from behind, and mitigates the impact of the collision.

The structure in the vicinity of the crash box 300 will be described in more detail with reference to FIGS. 3 and 4. FIG. 3 is a perspective view of the vehicle body 2 cut along line III-III in FIG. 2. FIG. 4 is an exploded view corresponding to FIG. 3. FIGS. 3 and 4 show a cross section obtained by cutting the left half of the rear side member 100 and the crash box 300. In FIGS. 3 and 4, the cross section is hatched. In FIGS. 3 and 4, each part is simplified and drawn. For example, the rear side member 100 and the crash box 300 are provided with a large number of beads and ribs for increasing the strength. However, they are not shown. Further, in FIGS. 3 and 4, the illustration of the rear bumper cover covering the rear bumper 400 is also omitted.

The rear side member 100 is a hollow beam that is configured of a pair of side plates 110 (in FIGS. 3 and 4, only the right half of the rear side member 100 is drawn, and the left side plate is not shown), an upper plate 120, and a lower plate 130. The beam is extended in the front-rear direction of the vehicle body 2, and the rear end is in contact with the back panel 200. A rear portion of the upper plate 120 is bent upward along the back panel 200 to form a flange 121 of the rear side member 100. A rear portion of the lower plate 130 is bent downward along the back panel 200 to form a flange 131 of the rear side member 100. Although not visible in FIG. 3, a rear portion of the side plate 110 is also bent toward the side along the back panel 200 to form a flange. In the rear side member 100, the flange of the rear portion of each of the side plate 110, the upper plate 120, and the lower plate 130 is in contact with the back panel 200, and is joined to the back panel 200 by welding or bolts. FIG. 4 shows a state in which the upper plate 120 is separated from the side plate 110.

An upper end of the side plate 110 is bent in a vehicle width direction to form a flange 111. The upper plate 120 is joined to the flange 111. A rear floor panel 4 (not shown in FIGS. 3 and 4) may be sandwiched between the flange 111 of the side plate 110 and the upper plate 120.

A recess 122 is provided on a surface on the vehicle body rear side of the flange 121 of the upper plate 120. The head of a bolt 123 is disposed in this recess 122. The bolt 123 will be described later. The flange 121 covers the bolt 123 (head). An edge of the flange 121 is joined to the back panel 200.

FIG. 4 shows a state in which the crash box 300 and the rear bumper 400 are separated from the back panel 200. The crash box 300 disposed behind the rear side member 100 includes a tubular main body 310, a front plate 320, and a rear plate 330. The main body 310 is disposed so that an axis of the tube is extended in the front-rear direction of the vehicle body 2. The front plate 320 and the rear plate 330 are each joined to the main body 310.

The rear bumper 400 is fixed to the rear plate 330 of the crash box 300 by bolts 331. The front plate 320 of the crash box 300 is fixed to the back panel 200 by the bolt 123. Although the crash box 300 is fixed to the back panel 200 by a plurality of bolts, in FIGS. 3 and 4, bolts other than the bolt 123 are not shown.

The back panel 200 is provided with a bolt hole 210. The bolt hole 210 is disposed above the rear end of the rear side member 100 (above the upper plate 120 (excluding the flange 121)). A bolt hole 321 is also provided in the front plate 320 of the crash box 300. The crash box 300 is fixed to the back panel 200 by the bolt 123 and a nut 322. The bolt 123 is passed through the bolt holes 210 and 321 and is tightened by the nut 322.

The flange 121 of the upper plate 120 of the rear side member 100 covers the bolt 123 and the bolt hole 210. The advantages of this structure will be explained.

The back panel 200 is a partition plate that separates the inside and the outside of the vehicle body. The back panel 200 is provided with the bolt hole 210. The crash box 300 is fixed to the back panel 200 by the bolt 123 that is passed through the bolt hole 210. Moisture such as raindrops may enter the inside of the vehicle body (a cabin or a luggage room) through a gap between the bolt 123 and the bolt hole 210.

On the cabin side of the back panel 200 (the front side of the back panel 200), the bolt 123 and the bolt hole 210 are covered with the flange 121 of the upper plate 120 of the rear side member 100. The edge of the flange 121 is joined to the back panel 200, and the bolt 123 (head) is completely isolated from the inside of the vehicle body 2. Moisture entering through the gap between the bolt 123 and the bolt hole 210 is blocked from the cabin by the flange 121 (cover).

The flange 121 that covers the bolt 123 and the bolt hole 210 is a part of the upper plate 120 of the rear side member 100. At the same time that the rear side member 100 is attached to the back panel 200, a cover that covers the bolt 123 and the bolt hole 210 is also attached. In the vehicle body 2 of the embodiment, it can be expected that the assembly cost of the rear portion of the vehicle body is lower than when the cover for the bolt hole is configured of a part separated from the rear side member 100.

The configuration in which the flange 121 of the rear side member 100 covers the bolt hole also provides the following advantages.

When an obstacle collides with the vehicle from behind the vehicle, a collision load is transmitted to the rear side member via the crash box, and the rear side member is deformed. From the viewpoint of impact resistance performance, it is desirable that the rear side member is deformed along the longitudinal direction. However, if the bolt hole cover (the cover of the bolt hole provided on the back panel) positioned above the rear end of the rear side member is hard, there is a possibility that the rear side member is deformed in a direction deviating from the longitudinal direction. If the rear side member is deformed in the direction deviating from the longitudinal direction, the impact resistance performance is deteriorated.

In the vehicle body 2 of the embodiment, the flange 121 covers the bolt hole 210 and the bolt 123. Since the flange 121 corresponds to an extension portion of the upper plate 120 of the rear side member 100, it does not significantly affect the impact resistance performance of the rear side member 100.

Points to be noted regarding the technique described in the embodiment will be described. In the vehicle body 2 of the embodiment, the nut 322 is disposed behind the front plate 320 of the crash box 300, and the bolt 123 is passed through the bolt hole 210 from the front of the vehicle body 2. The nut 322 may be placed in front of the back panel 200. In that case, the bolt 123 is passed through the bolt hole 210 from behind the front plate 320 of the crash box 300. In this case, the flange 121 of the upper plate 120 of the rear side member 100 covers the nut 322 for the bolt 123 that fixes the crash box 300 to the back panel 200 and covers the tip of the bolt 123.

A recess 122 is provided on the surface on the vehicle body rear side of the flange 121 of the upper plate 120 of the rear side member 100. The head of the bolt 123 or the nut 322 is disposed in the recess 122. By providing the recess 122, the head of the bolt 123 or the nut 322 can be appropriately surrounded and covered.

The vehicle body 2 includes two rear side members 100 and two crash boxes 300 (see FIG. 2). The structure around the crash box on the left side of the vehicle body 2 also has the structures shown in FIGS. 3 and 4.

Although the embodiments have been described in detail above, the embodiments are merely examples and do not limit the scope of claims. The techniques described in the claims include various modifications and variations of the specific example illustrated above. The technical elements described in the present specification or the drawings exhibit technical usefulness alone or in various combinations, and are not limited to the combinations described in the claims at the time of filing.

What is claimed is:

1. A vehicle body comprising:
    a rear side member that is extended in a front-rear direction at a rear portion of the vehicle body;
    a back panel that is in contact with a rear end of the rear side member; and
    a crash box that is disposed between the back panel and a rear bumper and that is positioned behind the rear side member, wherein:
    the crash box is fixed to the back panel with a bolt passed through a bolt hole that is extended through the back panel and that is positioned above the rear end of the rear side member;
    the rear side member is a hollow beam having a pair of side plates, an upper plate, and a lower plate, and a rear portion of the upper plate configures a flange that is bent upward along the back panel; and
    the flange covers the bolt and the bolt hole.

2. The vehicle body according to claim 1, wherein an edge of the flange is joined to the back panel.

3. The vehicle body according to claim 1, wherein:
    a recess is provided on a surface on a vehicle body rear side of the flange; and
    a head of the bolt is disposed in the recess.

4. The vehicle body according to claim 1, wherein:
    a recess is provided on a surface on a vehicle body rear side of the flange; and
    a tip of the bolt is disposed in the recess.

* * * * *